(12) United States Patent
Gross

(10) Patent No.: US 7,009,503 B2
(45) Date of Patent: Mar. 7, 2006

(54) COLLISION WARNING SYSTEMS AND METHODS

(75) Inventor: William Gross, Pasadena, CA (US)

(73) Assignee: Idealab, Pasadena, CA (US)

( * ) Notice: Subject to any disclaimer, the term of this patent is extended or adjusted under 35 U.S.C. 154(b) by 100 days.

(21) Appl. No.: 10/804,500

(22) Filed: Mar. 19, 2004

(65) Prior Publication Data

US 2005/0017858 A1     Jan. 27, 2005

Related U.S. Application Data

(60) Provisional application No. 60/457,823, filed on Mar. 25, 2003.

(51) Int. Cl.
   *B60Q 1/00* (2006.01)
(52) U.S. Cl. ............... 340/436; 340/435; 340/437; 340/903
(58) Field of Classification Search ............... None
   See application file for complete search history.

(56) References Cited

U.S. PATENT DOCUMENTS

| | | | | |
|---|---|---|---|---|
| 3,510,839 A | * | 5/1970 | Hyden et al. | 340/471 |
| 3,811,303 A | * | 5/1974 | Robertson | 70/237 |
| 4,257,703 A | | 3/1981 | Goodrich | 340/436 |
| 4,549,181 A | | 10/1985 | Tachibana et al. | 340/901 |
| 4,623,966 A | | 11/1986 | O'Sullivan | 701/301 |
| 4,632,543 A | | 12/1986 | Endo | 356/5.08 |
| 4,684,918 A | * | 8/1987 | Solomon | 340/475 |
| 4,970,653 A | | 11/1990 | Kenue | 701/301 |
| 5,590,217 A | | 12/1996 | Toyama | 382/104 |
| 5,983,161 A | | 11/1999 | Lemelson et al. | 701/301 |
| 5,990,574 A | | 11/1999 | Lecznar et al. | 370/10.5 |
| 6,026,347 A | | 2/2000 | Schuster | 701/301 |
| 6,138,062 A | | 10/2000 | Usami | 701/23 |
| 6,178,365 B1 | | 1/2001 | Kawagoe et al. | 701/41 |
| 6,204,759 B1 | | 3/2001 | Jahnke | 340/476 |
| 6,237,437 B1 | | 5/2001 | Takahashi | 74/484 R |
| 6,812,833 B1 | * | 11/2004 | Rothkop et al. | 340/475 |

* cited by examiner

*Primary Examiner*—Benjamin C. Lee
*Assistant Examiner*—Son Tang
(74) *Attorney, Agent, or Firm*—Knobbe, Martens, Olson & Bear LLP

(57) ABSTRACT

An automobile collision warning system includes a sensor system configured to generate a sensor signal corresponding to at least a first sensed object in the vicinity of the automobile. A processor is coupled to the sensor system, wherein the processor is configured to determine if a potential collision risk exists based on the sensor signal and to generate a corresponding collision warning signal. A turn signal inhibition apparatus coupled to the processor configured to inhibit movement of a turn signal stalk in response to the collision warning signal, to thereby warn an automobile operator of the potential collision.

21 Claims, 3 Drawing Sheets

COLLISION WARNING SYSTEMS AND METHODS

PRIORITY CLAIM

This application claims the benefit under 35 U.S.C. 119(e) of U.S. Provisional Application No. 60/457,823, filed Mar. 25, 2003, the contents of which are incorporated herein in their entirety.

BACKGROUND OF THE INVENTION

1. Field of the Invention

The present invention relates to reducing the incidence of collisions involving a vehicle, and in particular, to methods and systems for providing a vehicle operator with information relating to potential collisions.

2. Description of the Related Art

Various vehicular collision avoidance systems have been developed in an effort to reduce accidents and better manage traffic flow. With some conventional systems, cars or trucks are equipped with radar, laser, or other detection systems, that are used to determine the location of the objects. The object location information is provided to the driver, often by depicting the information on a CRT or LCD display using direction vectors or the like. The driver is then theoretically able to use the object location information to determine the positions and relative motions of the objects and to avoid collisions with other vehicles.

Disadvantageously, the amount of object location-related information can be overwhelming to a driver. Thus, rather than helping the driver avoid a collision, often the driver either ignores the information, or is so distracted by the information that the driver becomes more collision-prone. Further, conventional collision detection displays are often expensive, complex, and can be unreliable in very hot or cold environments.

SUMMARY OF THE INVENTION

The present invention is directed to methods and systems for providing a vehicle operator with information relating to potential collisions. In contrast to expensive and distracting collision display systems, one embodiment of the present invention utilizes a common vehicle control mechanism, such as a turn signal stalk, to warn the vehicle operator of a potential collision.

For example, in one embodiment objects in the vicinity of the vehicle are detected using a conventional detection sensor and collision prediction system, such as one based on a radio frequency (RF) radar, a laser radar (LIDAR), or using an imaging camera. By way of illustration, if an object, such as a car, is in an adjacent lane and is directly parallel to, or slightly behind or ahead of the vehicle, the vehicle might collide with the object if the driver attempts to change into that lane. If the detection sensor detects such an object, a collision prediction system inhibits the vehicle's turn signal stalk from being moved by the driver, thereby preventing the driver from signaling a lane change. The driver will thus be warned not to change lanes at this time. Once the detection sensor system determines the danger has passed, the driver will be allowed to appropriately signal a lane change.

An actuator coupled to the collision prediction system can be used to inhibit the movement of the turn signal stalk. The actuator may be, by way of example, a solenoid, that when activated inserts a plunger or the like into a corresponding bore, slot or notch in the base or mounting plate of the turn signal stalk, thereby preventing the movement of the turn signal stalk.

In another embodiment, rather than always preventing the turn signal stalk from moving in either an up or down direction when a collision risk exists on either side of the vehicle, the turn signal stalk movement is only inhibited from signaling movement in the direction of the object that is source of the collision risk. In yet another embodiment, rather then preventing movement entirely, the force or pressure that the driver needs to apply to move the turn signal stalk in the "risky" direction will be increased to thereby warn the driver.

Embodiments of the present invention can be used with other collision warning systems, including without limitations, collision warning displays and the like.

BRIEF DESCRIPTION OF THE DRAWINGS

These and other features of the invention will now be described with reference to the drawings summarized below. These drawings and the associated description are provided to illustrate example preferred embodiments of the invention and are not intended to limit the scope of the invention.

DETAILED DESCRIPTION OF PREFERRED EMBODIMENTS

The present invention is directed to methods and systems for warning a vehicle operator of a potential collision. Advantageously, one embodiment of the present invention utilizes a common driver interface device, such as a turn signal control stalk, to warn the driver of a potential collision.

Figure 1:
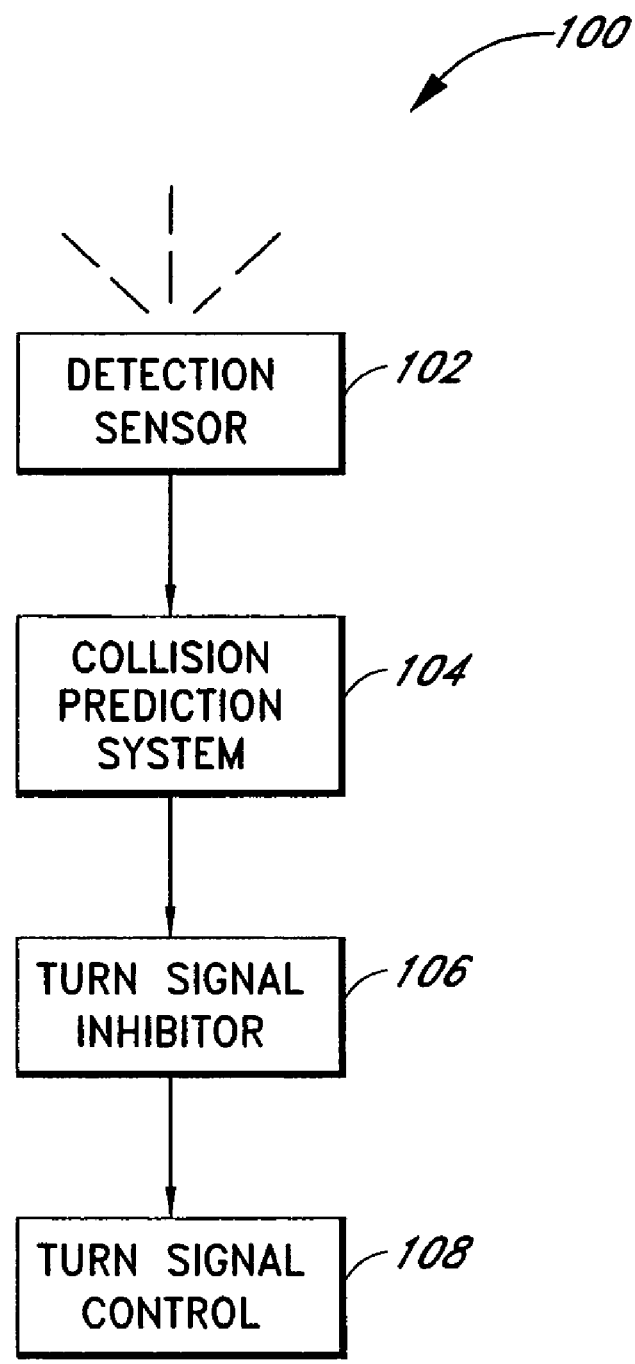
FIG. 1 illustrates one example embodiment of a vehicle system incorporating an embodiment of the present invention.

FIG. 1 illustrates one example of a vehicle system 100 incorporating an embodiment of the present invention. In this example, it will be assumed that the vehicle is a car, though in other embodiments the vehicle can be a truck, bus, boat, or the like. The car 100 includes a detection system 102 used to detect objects in the environment around all or portions of the car. For example, the detection system 102 can detect vehicles in lanes adjacent to the lane that the car 100 is in.

The detection system 102 can be active and/or passive. If the detection system 102 is active, the detection system 102 emits energy and detects the reflected or returned energy from objects, such as other cars. If the detection system 102 is passive, the detection system 102 does not radiate energy towards other objects, but instead detects objects by monitoring energy, such as infrared energy resulting from heat, emitted by the objects, or by detecting or capturing ambient light reflected by the objects. For example, the detection system 102 can include a radio frequency (RF) radar, a laser radar (LIDAR), an infrared sensor, and/or a camera. The detection system 102 can include multiple sensors, mounted on the front, rear, and/or sides of the vehicle 100.

The detection system 102 is coupled to a collision prediction system 104, which receives detection signals from the detection system 102. In addition, the collision prediction system 104 receives information regarding vehicle speed and acceleration from conventional vehicle sensors or a vehicle computer. The collision prediction system 104 also receives information on the direction of motion of the car 100 using a compass, GPS or other well-known direction finding devices. Based on the detection signals, the car's speed, acceleration and direction, the collision prediction system 104 determines the physical relationship or placement of the detected objects relative to the car 100, as well as the speed and acceleration of the car relative to the objects.

The collision prediction system 104 is coupled to a driver interface, in this example, to a turn signal inhibitor 106, which is in turn coupled to a turn signal control, such as a turn signal stalk 108. When the collision prediction system 104 determines that there is an object, such as another car, a truck, motorcycle, stationary object, or the like, in an adjacent lane and parallel to, or slightly behind or ahead of the vehicle, the collision prediction system 104 activates the turn signal inhibitor 106. The turn signal inhibitor 106 prevents the driver from moving the turn signal stalk 108 in a direction that would signal movement in the direction of the object at issue.

For example, if another vehicle is adjacent to, and in the lane to the right of the car 100, the turn signal inhibitor 106 would prevent the driver from pushing the turn signal stalk 108 in the downwards direction, as would normally be done to activate the right turn light to notify others that the driver intends to move into the right lane. Thus, the driver would be warned by his or her inability to so push the turn signal stalk that a collision might result if the driver changes into the right lane at this time. Once the risk of collision has passed, the turn signal inhibitor 106 would allow the turn signal stalk to be moved in the normal manner.

In another embodiment, rather then preventing movement entirely, the turn signal inhibitor 106 significantly increases the force needed to move the turn signal stalk 108 in the "risky" direction to thereby warn the driver that the car might collide with another object if the driver attempts to change into that lane. However, the driver would still be able to move the stalk 108, albeit with increased force than would normally be needed. By way of example, a cam requiring a certain amount of force to turn, can engage the turn signal stalk 108. Similarly, if the driver interface being used to warn the driver of a potential collision is a steering wheel, the force needed to turn the steering wheel in the dangerous direction can be increased using a pressure plate appropriately applied.

Figure 2:
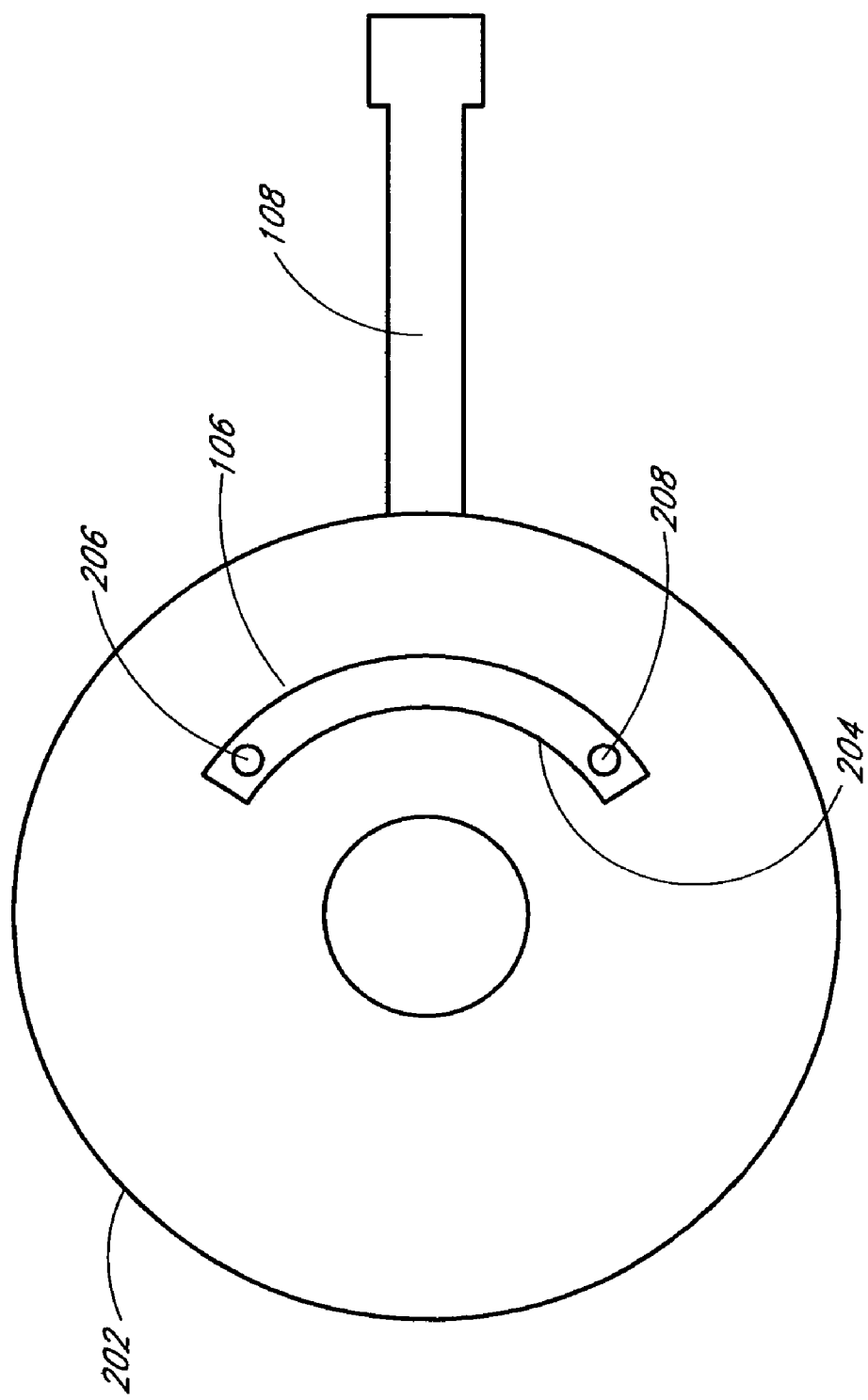
FIG. 2 illustrates an example embodiment of a turn signal movement inhibitor mechanism.

FIG. 2 illustrates an example embodiment of a turn signal movement inhibitor mechanism. The turn signal stalk 108 is mounted to a plate or fixture 202, which is in turn moveably coupled to a steering wheel column. The fixture 202 includes a curved slot 204 opened on the top and bottom. Two actuators, including plungers or posts 206, 208 are positioned beneath the slot 204.

The posts 206, 208 may form part of a solenoid or other actuator type, by way of example. A solenoid is an electromagnet tube that can be used to move a piece of metal linearly. In this example, each post 206, 208 is a cylindrical permanent magnet. The magnetic posts 206, 208 are moved in and out by changing the direction of the magnetic field in the solenoid. In this example, each post 206, 208 can be separately raised into the slot 204 and withdrawn from the slot 204. In other embodiments, rather than using a slot 204, one or more bores, notches, or other engagement mechanisms can be used. In addition, rather than using posts, or other engagement devices, such as gears, hooks, or the like can be used to selectively and fixedly engage the fixture 202.

In the illustrated example, in order to prevent the driver from signaling movement to the right, the movement of the turn signal stalk 108 in the downward direction is prevented by raising the post 206 into the slot 204. The post 206 will then block the fixture 202, and hence the turn signal stalk 108, from rotating downward. Similarly, in order to prevent the driver from signaling movement to the left, the movement of the turn signal stalk 108 in the upward direction is prevented by raising the post 208 into the slot 204. In order to prevent movement of the turn signal stalk 108 in either the upward direction or the downward direction, both posts 206, 208 would be raised into the slot 204. If there is no collision risk, both posts 206, 208 can be lowered to allow the turn signal stalk 108 to be moved in either the upward direction or the downward direction.

Figure 3:
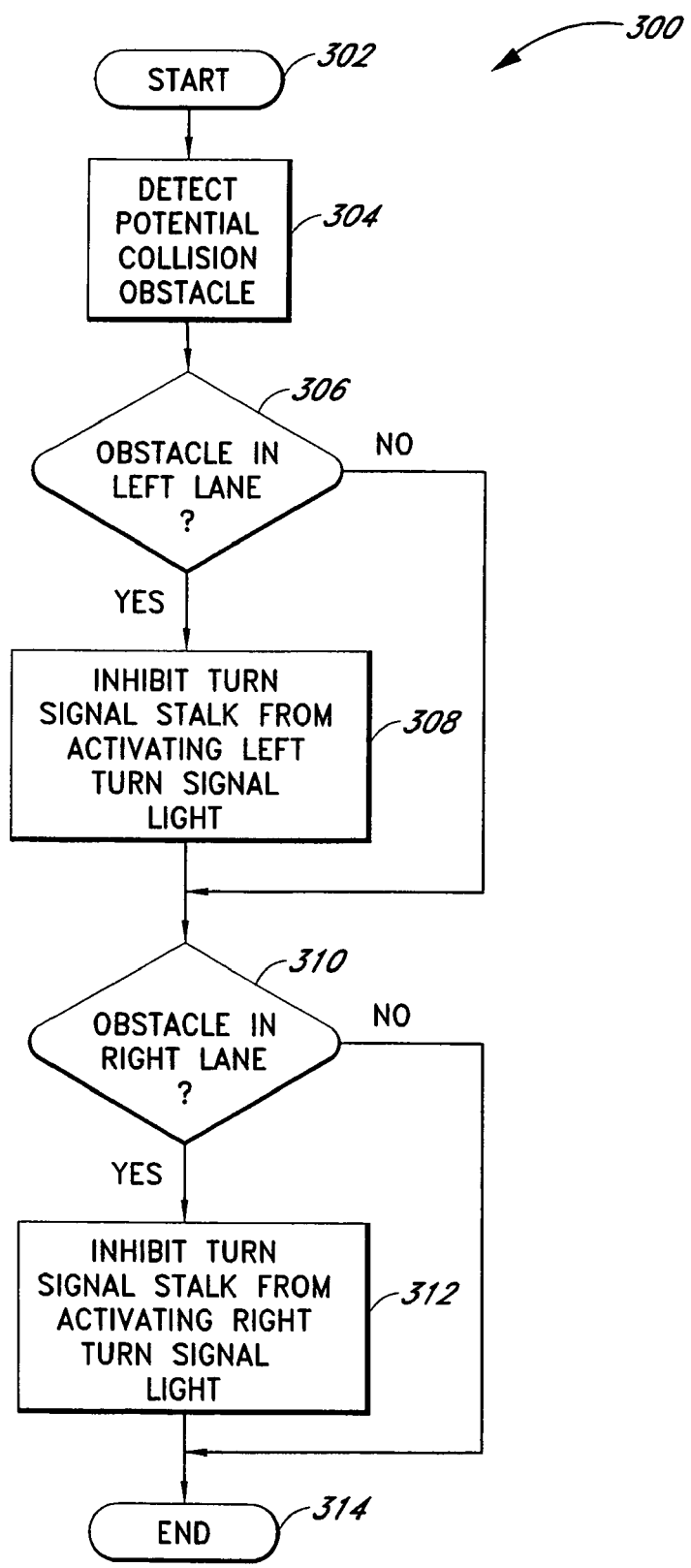
FIG. 3 illustrates an example embodiment of turn signal movement inhibitor process.

FIG. 3 illustrates an example embodiment of turn signal movement inhibitor process 300 that can be used with the example systems and apparatuses illustrated in FIGS. 1 and 2. Beginning at Start state 302, the process 300 proceeds to state 304. At 304 a sensor scans the vehicle vicinity for the purposes of determining if there are obstacles which may be potential collision risks. Proceeding to state 306, a determination is made as to whether there is an obstacle in a lane to the left of, and in the vicinity of the vehicle. If there is such an obstacle, the process 300 proceeds to state 308, where the turn signal stalk movement is inhibited from activating the vehicle's left turn signal light. Otherwise, the process 300 proceeds directly from state 306 to state 310. At state 310, a determination is made as to whether there is an obstacle in a lane to the right of, and in the vicinity of the vehicle. If there is such an obstacle, the process 300 proceeds to state 312, where the turn signal stalk movement is inhibited from activating the vehicle's right turn signal light, then the process 300 proceeds to End state 314. Otherwise, the process 300 proceeds directly from state 310 to End state 314.

Thus, in contrast to expensive and distracting conventional collision display systems, embodiments of the present invention advantageously utilize a common vehicle control mechanism, such as a turn signal control, to efficiently warn the vehicle operator of a potential collision.

Various embodiments of the invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. An automobile collision warning system, comprising;
    a sensor system configured to generate a sensor signal corresponding to at least a first sensed object in the vicinity of the automobile;
    a processor coupled to the sensor system, wherein the processor is configured to determine if a potential collision risk exists based on the sensor signal and to generate a corresponding collision warning signal; and
    a turn signal inhibition apparatus coupled to the processor and configured to inhibit movement of a turn signal stalk in response to the collision warning signal, to thereby warn an automobile operator of the potential collision.

2. The automobile collision warning system as defined in claim 1, wherein the turn signal inhibition apparatus inhibits movement of the turn signal stalk in a first direction when the potential collision risk is on the right side of the automobile, and wherein the turn signal inhibition apparatus inhibits movement of the turn signal stalk in a second direction when the potential collision risk is on the left side of the automobile.

3. The automobile collision warning system as defined in claim 1, further comprising a first fixture coupled to the turn signal stalk, the first fixture having a receiving area configured to receive a portion of an actuator activated in response to the collision warning signal.

4. The automobile collision warning system as defined in claim 1, wherein the turn signal inhibition apparatus prevents the movement of the turn signal stalk.

5. The automobile collision warning system as defined in claim 1, wherein the turn signal inhibition apparatus increases the effort needed to move the turn signal stalk.

6. A method of warning a vehicle operator of a potential collision, comprising:
 receiving a sensor signal corresponding to at least a first sensed object located to one side of the vehicle;
 determining, based at least in part on the sensor signal, if a collision risk exists;
 generating a collision warning signal at least partly in response to determining that the collision risk exists; and
 inhibiting activation of a turn signal indicator at least partly in response to the collision warning signal.

7. The method as defined in claim 6, wherein the collision warning signal is further generated at least partly in response to vehicle speed.

8. The method as defined in claim 6, wherein the act of inhibiting activation of the turn signal includes preventing movement of a turn signal stalk.

9. The method as defined in claim 6, wherein the act of inhibiting activation of the turn signal includes preventing movement of a turn signal stalk in a first direction when the potential collision risk is on the right side of the vehicle, and preventing movement of the turn signal stalk in a second direction when the potential collision risk is on the left side of the vehicle.

10. The method as defined in claim 6, wherein the act of inhibiting activation of the turn signal includes activating an actuator that physically engages a turn signal user-accessible control.

11. A vehicle collision warning system, comprising;
 a processing system configured to determine if a collision risk is present based on a sensor signal and to selectively generate a collision warning signal at least partly in response to determining that a collision risk is present; and
 an actuator that receives the collision warning signal and at least partly in response, inhibits movement of a turn signal control.

12. The vehicle collision warning system as defined in claim 11, further comprising a sensor that generates the sensor signal, wherein the sensor is coupled to the processing system.

13. The vehicle collision warning system as defined in claim 11, wherein the actuator includes a solenoid that mates with a receiving apparatus coupled to a turn signal stalk, to thereby inhibit movement of the turn signal stalk.

14. The vehicle collision warning system as defined in claim 11, wherein the actuator selectively inhibits movement of the turn signal control in at least one of an upwards and a downwards direction.

15. The vehicle collision warning system as defined in claim 11, wherein the actuator inhibits movement of the turn signal control by increasing the force needed to move the turn signal control.

16. A vehicle, comprising;
 a sensor system, including at least a first sensor positioned to monitor objects on the vehicle's left side and the vehicle's right side, and that generates at least a first sensor signal corresponding to at least a first sensed object in the vicinity of the vehicle;
 a processing device coupled to the sensor system, wherein the processor determines that the first sensed object is in the vicinity of the vehicle based on at least in part on the first sensor signal and is configured to generate a corresponding turn signal inhibition signal at least partly in response to determining that the first sensed object is in the vicinity of the vehicle; and
 an actuator coupled to the processing device, the actuator configured to inhibit movement of a turn signal control at least partly in response to the turn signal inhibition signal, to thereby notify a vehicle operator of the first sensed object.

17. The vehicle as defined in claim 16, wherein the sensor system includes at least one of a radio frequency radar, a laser radar, and an imaging camera.

18. The vehicle as defined in claim 16, further comprising a mounting apparatus coupled to the turn signal control and a steering wheel column.

19. The vehicle as defined in claim 16, wherein the actuator includes at least a first solenoid used to prevent the turn signal control from being moved in a first direction and a second solenoid used to prevent the turn signal control from being moved in a second direction.

20. The vehicle as defined in claim 16, wherein the vehicle is one of a car and a truck.

21. The vehicle as defined in claim 16, turn signal control is a stalk movable in an upwards direction and a downwards direction.

* * * * *